United States Patent
Kondo

(10) Patent No.: US 10,210,438 B2
(45) Date of Patent: Feb. 19, 2019

(54) PRINTER AND CONTROL METHOD OF A PRINTER

(71) Applicant: SEIKO EPSON CORPORATION, Tokyo (JP)

(72) Inventor: Ryota Kondo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/887,493

(22) Filed: Feb. 2, 2018

(65) Prior Publication Data
US 2018/0232610 A1    Aug. 16, 2018

(30) Foreign Application Priority Data
Feb. 10, 2017    (JP) .................................. 2017-022770

(51) Int. Cl.
| | |
|---|---|
| *G06F 3/12* | (2006.01) |
| *G06F 17/22* | (2006.01) |
| *G06F 17/28* | (2006.01) |
| *G06K 15/02* | (2006.01) |
| *G06F 15/02* | (2006.01) |

(52) U.S. Cl.
CPC ....... *G06K 15/1807* (2013.01); *G06F 3/1206* (2013.01); *G06F 3/1244* (2013.01); *G06F 17/2217* (2013.01); *G06F 17/2863* (2013.01); *G06K 15/1802* (2013.01); *G06K 15/1805* (2013.01); *G06K 15/1809* (2013.01); *G06K 15/1828* (2013.01); *G06K 15/1831* (2013.01); *G06K 2215/0017* (2013.01)

(58) Field of Classification Search
CPC ........ H04N 1/00498; H04N 2201/0039; G06F 17/211; G06F 3/1206; G06F 17/214; G06F 3/1211; G06F 3/1227; G06F 3/1244; G06F 3/1245; G06F 3/1284; G06F 17/22; G06F 17/30056; G06F 17/30899; G06F 21/10
USPC .... 358/1.1, 1.13, 1.15, 1.11, 1.14, 1.9, 1.18, 358/402; 709/204, 206
See application file for complete search history.

(56) References Cited

U.S. PATENT DOCUMENTS 7,027,180 B2 *   4/2006  Nishikawa .............. G06F 17/21
                                                 358/1.15
7,839,531 B2 *  11/2010  Sugiyama .......... H04N 1/00957
                                                 358/1.12
(Continued)

FOREIGN PATENT DOCUMENTS

EP    2587409 A1    5/2013
JP    06-242895 A   9/1994
(Continued)

OTHER PUBLICATIONS

European Search Report issued in EP 18155814 dated May 31, 2018.

*Primary Examiner* — Negussie Worku
(74) *Attorney, Agent, or Firm* — Workman Nydegger

(57) ABSTRACT

A printer has a printing mechanism for printing on roll paper; RAM storing font data for multiple languages having at least some character codes in common, and the starting address of the font data for each of the multiple languages; a communicator that receives a command specifying starting addresses and character codes; and a controller that reads font data corresponding to the character codes received by the communicator from RAM based on the starting address specified by the command, and controlling the printing mechanism to print based on the read font data.

10 Claims, 3 Drawing Sheets

(56) References Cited

U.S. PATENT DOCUMENTS

| | | | | |
|---|---|---|---|---|
| 7,973,792 B2* | 7/2011 | Tsukamoto | ............ | G06T 11/203 |
| | | | | 345/467 |
| 8,149,440 B2* | 4/2012 | Uchikawa | ................ | H04L 67/16 |
| | | | | 358/1.15 |
| 8,395,793 B2* | 3/2013 | Nishikawa | ......... | H04N 1/00413 |
| | | | | 358/1.1 |
| 2003/0142233 A1* | 7/2003 | Eckhardt | .................. | H04N 5/46 |
| | | | | 348/512 |
| 2006/0072316 A1* | 4/2006 | Park | .......................... | F21K 9/00 |
| | | | | 362/231 |
| 2006/0227343 A1* | 10/2006 | Yamaguchi | ......... | H04N 1/00244 |
| | | | | 358/1.1 |
| 2007/0176802 A1 | 8/2007 | Fay et al. | | |
| 2007/0229512 A1* | 10/2007 | Tsukamoto | ............ | G06F 3/1204 |
| | | | | 345/467 |
| 2013/0033720 A1* | 2/2013 | Hirayama | ............. | G06F 3/1206 |
| | | | | 358/1.14 |
| 2016/0012465 A1* | 1/2016 | Sharp | ...................... | G06Q 20/18 |
| | | | | 705/14.17 |
| 2017/0116163 A1* | 4/2017 | Kondo | ................. | G06F 17/2247 |
| 2017/0226641 A1* | 8/2017 | Qi | ............................ | C23C 16/52 |

FOREIGN PATENT DOCUMENTS

| | | | |
|---|---|---|---|
| JP | 11-245455 | A | 9/1999 |
| JP | 2000-250724 | A | 9/2000 |
| JP | 2001-060196 | A | 3/2001 |
| JP | 2004-112341 | A | 4/2004 |
| JP | 2005-109791 | A | 4/2005 |
| JP | 2005-196397 | A | 7/2005 |
| JP | 2012-027207 | A | 2/2012 |
| JP | 2016-128229 | A | 7/2016 |

* cited by examiner

PRINTER AND CONTROL METHOD OF A PRINTER

This application claims priority under 35 U.S.C. § 119 to Japanese Patent Application No. 2017-22770 filed on Feb. 10, 2017, the entire disclosure of which is expressly incorporated by reference herein.

BACKGROUND

1. Technical Field

The present invention relates to a printer and a control method of a printer.

2. Related Art

Printers that print characters based on font data are known from the literature. For example, JP-A-H11-245455 describes a printer that, based on font data including a data segment storing bitmap data for four different print fonts and a header segment storing at least size information indicating the horizontal and vertical dot counts of the bitmap data, executes a rendering process of reading bitmap data from the data segment based on size information in the header segment, and rendering character data.

Some character codes of font data for one language may also be used as a character code of font data for another language. To prevent printing characters of a language not intended by the user when a character code used in multiple languages is received, printers such as described in JP-A-H11-245455 may store font data for only one language. A printer of this type, however, cannot, by itself, print characters in multiple languages that use common character codes. A simple configuration enabling easily printing characters in multiple languages that use common character codes is also not described in the literature.

SUMMARY

An objective of the present invention is therefore to provide a printer that by itself can easily print characters of multiple languages.

A printer according to one aspect of the invention has: a printing mechanism configured to print on a print medium; storage storing font data for multiple languages having at least some character codes in common, and location information of the font data for each of the multiple languages; a communicator configured to receive a command specifying location information, and character codes; and a controller configured to read font data corresponding to the character codes received by the communicator from the storage based on the location information specified by the command, and control the printing mechanism to print based on the read font data.

This aspect of the invention changes and reads, based on location information specified by a command, from font data for multiple languages, font data corresponding to the character codes received by the communicator, and prints based on the font data that was read. As a result, a single printer can, by changing the language, easily print the desired characters in multiple languages even when the printer stores font data for multiple languages in which the font data for one language contains at least some character codes that are also used in another language to represent different characters.

In another aspect of the invention, the storage stores font data for at least two of the following languages: Japanese, Chinese, and Korean.

Because font data for at least two of the Japanese, Chinese, and Korean languages is stored in memory, when the printer prints characters in at least two of the Japanese, Chinese, and Korean languages, this aspect of the invention can prevent printing characters in a language not intended by the user, and a single printer can easily print in least two of the Japanese, Chinese, and Korean languages.

In another aspect of the invention, the controller does not change the font data of the multiple languages when the character codes received by the communicator are character codes related to at least some characters defined by one byte.

In this aspect of the invention, because the controller does not change the font data of the multiple languages when the character codes received by the communicator are character codes related to at least some characters defined by one byte, even if the process switching the font data is not executed, the print processing speed can be improved for at least some characters defined by one byte when the printer prints characters in multiple languages.

In another aspect of the invention, when the character codes received by the communicator are character codes related to characters defined by two bytes, the controller changes the font data read from storage to font data corresponding to the location information specified by the command.

In this aspect of the invention, because the controller changes the font data that is read from storage to font data corresponding to the location information specified by the command when the character codes received by the communicator are character codes related to characters defined by two bytes, a single printer can print characters in multiple languages and can prevent printing characters in a language not intended by the user.

A printer according to another aspect of the invention also has nonvolatile memory; the storage is volatile memory; and the controller, when the printer turns on, copies the font data for multiple languages stored in the nonvolatile memory to the volatile memory, and stores in the volatile memory the location information corresponding to the font data of the multiple languages in the volatile memory.

In this aspect of the invention, when the printer turns on, the font data for multiple languages stored in the nonvolatile memory is copied to the volatile memory, and the location information corresponding to the font data of the multiple languages in the volatile memory is stored to the volatile memory. As a result, the device from which font data is acquired (is read) changes to volatile memory, and the processing speed can be improved when a single printer prints in multiple languages.

Another aspect of the invention is a control method of a printer having a printing mechanism configured to print on a print medium; storage storing font data for multiple languages having at least some character codes in common, and location information of the font data for each of the multiple languages; and a communicator configured to receive a command specifying location information, and character codes; the control method including reading font data corresponding to the character codes received by the communicator from the storage based on the location information specified by the command; and controlling the printing mechanism to print based on the read font data.

This aspect of the invention changes and reads, based on location information specified by a command, from font data for multiple languages, font data corresponding to the character codes received by the communicator, and prints based on the font data that was read. As a result, a single printer can, by changing the language, easily print the desired characters in multiple languages even when the printer stores font data for multiple languages in which the font data for one language contains at least some character codes that are also used for another language.

Other objects and attainments together with a fuller understanding of the invention will become apparent and appreciated by referring to the following description and claims taken in conjunction with the accompanying drawings.

DESCRIPTION OF EMBODIMENTS

Figure 1:
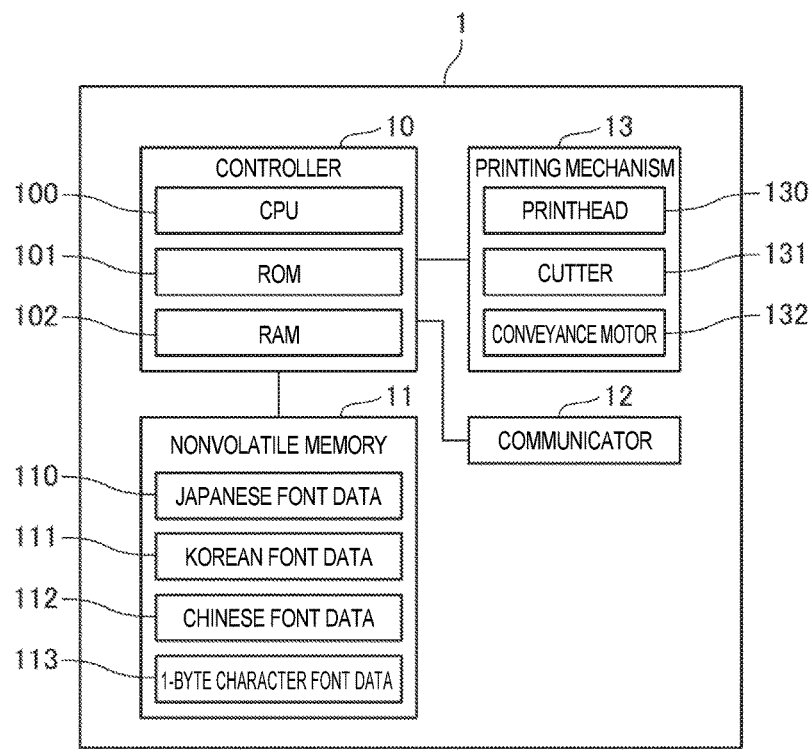
FIG. 1 is a block diagram of the configuration of a printer according to an embodiment of the invention.

FIG. 1 is a block diagram of the configuration of a printer 1(printing device) according to an embodiment of the invention.

As shown in FIG. 1, the printer 1 has a controller 10, nonvolatile memory 11, communicator 12 (communication circuit on board), and printing mechanism 13.

The controller 10 includes a CPU 100 (processor), ROM 101, RAM 102 (memory; volatile memory); other peripheral control circuits, and controls parts of the printer 1.

ROM 101 non-volatilely stores control programs executed by the CPU 100, and other data. RAM 102 functions as working memory for the CPU 100, and temporarily stores data. The CPU 100 controls parts of the printer 1 by reading and running firmware or other control programs stored in ROM 101.

Nonvolatile memory 11 may be an EEPROM (Electrically Erasable Programmable Read-Only Memory), flash memory, or other type of semiconductor memory device, a hard disk drive or other type of storage medium, and nonvolatilely stores data rewritably. The nonvolatile memory 11 stores Japanese font data 110, Korean font data 111, Chinese font data 112, and 1-byte character font data 113. Because the font data is stored in the nonvolatile memory 11 of the printer 1, it may also be referred to as internal fonts.

For characters used in Japanese, the Japanese font data 110 stores font data for each character. The font data is the actual data expressing characters in a form that can be printed on roll paper (print media), and may be bitmap data, for example. For each character, the Japanese font data 110 relates actual data to a character code. Examples of character codes related to the Japanese font data 110 include ISO-2022-JP, Shift_JIS, and EUC-JP character codes. The character codes related to the Japanese font data 110 in this embodiment include both character codes defined by one byte, and character codes defined by two bytes.

A character defined by one byte is a character for which the character code corresponding to one character is expressed by one byte (8 bits), and such characters are commonly used in European languages having relatively few characters.

A character defined by two bytes is a character for which the character code corresponding to one character is expressed by two bytes (16 bits), and such characters are commonly used for non-European languages, such as Asian languages, having a relatively large number of characters.

Font data for a single character in the Japanese font data 110 is referred to below as single Japanese character font data.

For characters used in Korean, the Korean font data 111 stores font data for each character. For each character, the Korean font data 111 relates actual data to a character code. An example of character codes related to the Korean font data 111 is the KSC5601 character code. The character codes related to the Korean font data 111 in this embodiment include both character codes defined by one byte, and character codes defined by two bytes.

Font data for a single character in the Korean font data 111 is referred to below as single Korean character font data.

For characters used in Chinese, the Chinese font data 112 stores font data for each character. For each character, the Chinese font data 112 relates actual data to a character code. Examples of character codes related to the Chinese font data 112 include GB18030 (Simplified) and Big5 (Traditional) character codes. The character codes related to the Chinese font data 112 in this embodiment include both character codes defined by one byte, and character codes related to characters defined by two bytes.

Font data for a single character in the Chinese font data 112 is referred to below as single Chinese character font data.

Individual character codes specific to each language, and the font data corresponding to those character codes, are stored in nonvolatile memory 11.

In this embodiment of the invention, at least some of the character codes defined by one byte (specifically, half-width alphanumeric characters, specific symbols) are the same in the Japanese font data 110, Korean font data 111, and Chinese font data 112. These character codes are also the same as the character codes related to the 1-byte character font data 113 described below. All other character codes are different.

The 1-byte character font data 113 stores font data for each half-width alphanumeric character and other specific symbols, that is, for at least some characters defined by a 1-byte character code. For each character, the 1-byte character font data 113 relates actual data to a character code. A character code related to the 1-byte character font data 113 is a character code defined by one byte, that is, a character code expressed by one byte, such as 0×31 (31 in hexadecimal, where here and below 0x denotes hexadecimal notation).

Font data for a single character in the 1-byte character font data 113 set is referred to below as 1-byte character font data.

The communicator 12, as controlled by the controller 10, communicates according to a specific communication protocol with a host computer or other external device that controls the printing operation of the printer 1.

The printing mechanism 13 includes such mechanisms as the printhead 130, cutter 131, and conveyance motor 132.

In this example, the printhead 130 is a thermal line head having multiple heat elements disposed at a specific resolution in the direction perpendicular to the roll paper conveyance direction, and forms dots on the roll paper, which in this example is thermal paper, by heating the heat elements.

The cutter 131 includes a fixed knife and movable knife, and cuts the roll paper by the movable knife moving relative to the fixed knife so that the fixed knife and movable knife cross in a scissor action, for example.

The conveyance motor 132 turns conveyance rollers (not shown in the figure) to convey roll paper stored inside the printer 1 housing.

The printing mechanism 13, as controlled by the controller 10, prints characters and images on the roll paper by the printhead 130 while conveying the roll paper by the conveyance motor 132, and cuts the roll paper at a specific position by the cutter 131 to produce a receipt, for example.

The values of at least some of the character codes may be common to multiple languages. However, the font data identified by the same character code in each language may be different. For example, while the character code 0xB0A1 (hexadecimal) is used in both Korean font data 111 and Chinese font data 112, the corresponding font data is different. Because the languages are different, the corresponding actual data is different even though the character code is the same, the font data based on the character code is Korean font data 111 or Chinese font data 112, and is different. The font data in such languages includes an extremely large number of different characters, such as Japanese font data 110, Korean font data 111, and Chinese font data 112, each of which include kanji (in Japanese; also known as Chinese characters).

In this way, when printing based on font data of different languages having at least some character codes in common, the printer 1 may print on the roll paper characters of a language not intended by the user. To solve this problem, printers of the related art may store font data for only one language, and be configured to print characters on roll paper based on font data for the one installed language. It is therefore not simple for a printer 1 according to the related art to, by itself, easily switch between characters of multiple languages when printing.

Depending on where the printer 1 is installed and used, however, a single printer 1 can preferably easily print characters in multiple languages. Examples of such installations include stores, such as tax-free stores in airports, frequently by foreign customers from different countries and different languages. Another example is a location where the probability that the languages understandable by the customers is limited to a single language is low. In such applications, as customers using different languages come to the cash register, the printer 1 can preferably change the printed characters appropriately to the language understood by the customer and produce receipts printed in characters appropriate to the customer's language. However, because the printer 1 of the related art cannot easily print characters in multiple languages, the printer 1 cannot easily produce receipts printed with characters corresponding to the language that is used by a particular customer.

To solve this problem, the printer 1 according to the invention operates as described below.

Figure 2:
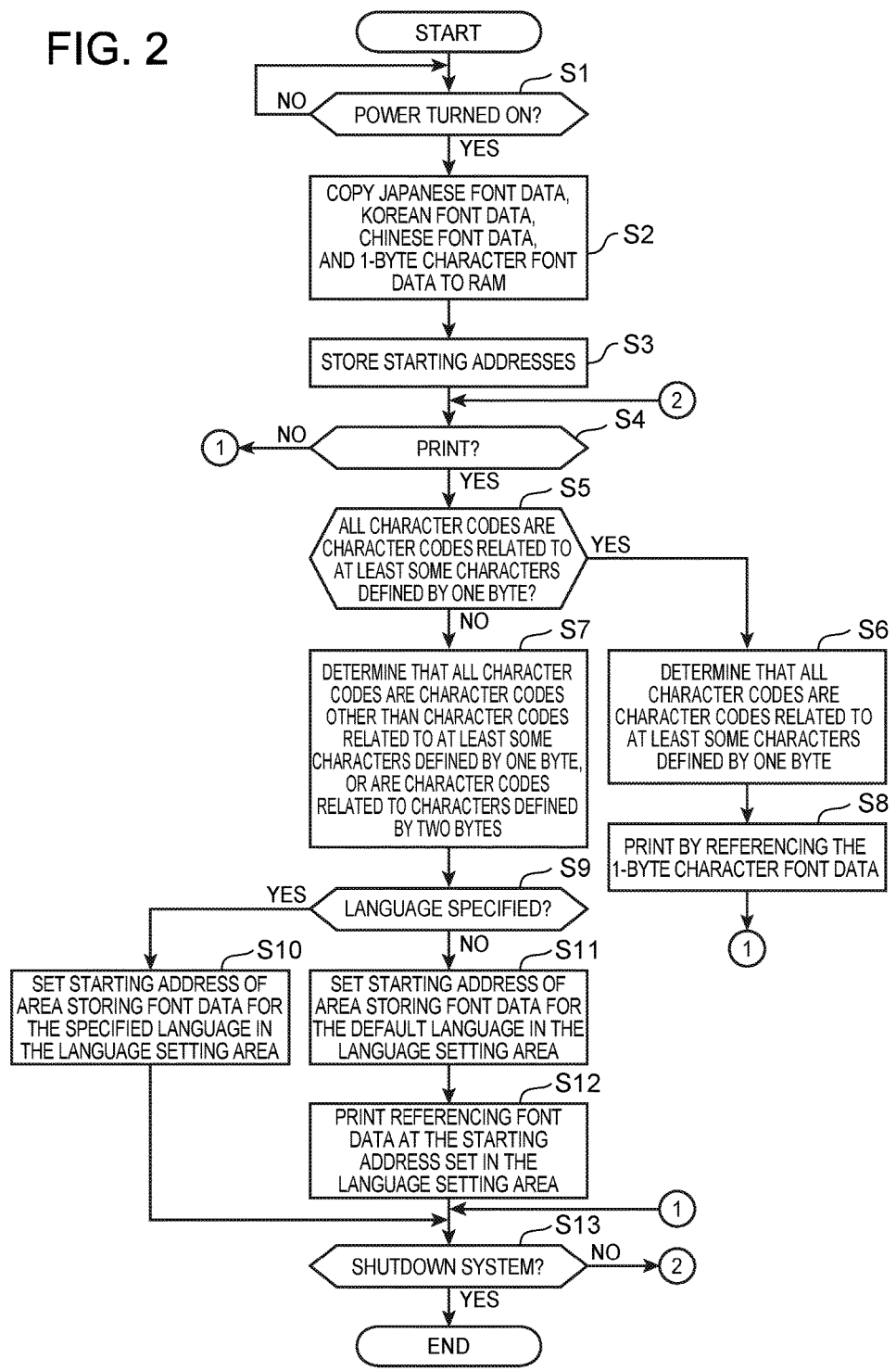
FIG. 2 is a flow chart of the operation of a printer according to an embodiment of the invention.

FIG. 2 is a flow chart of the operation of the printer 1.

Triggered by a user operation turning the power on, for example, the controller 10 of the printer 1 determines if the printer 1 started (step S1).

If the controller 10 determines the printer 1 started (step S1: YES), the controller 10 copies the Japanese font data 110, Korean font data 111, Chinese font data 112, and 1-byte character font data 113 stored in nonvolatile memory 11 to RAM 102 (step S2).

Figure 3:
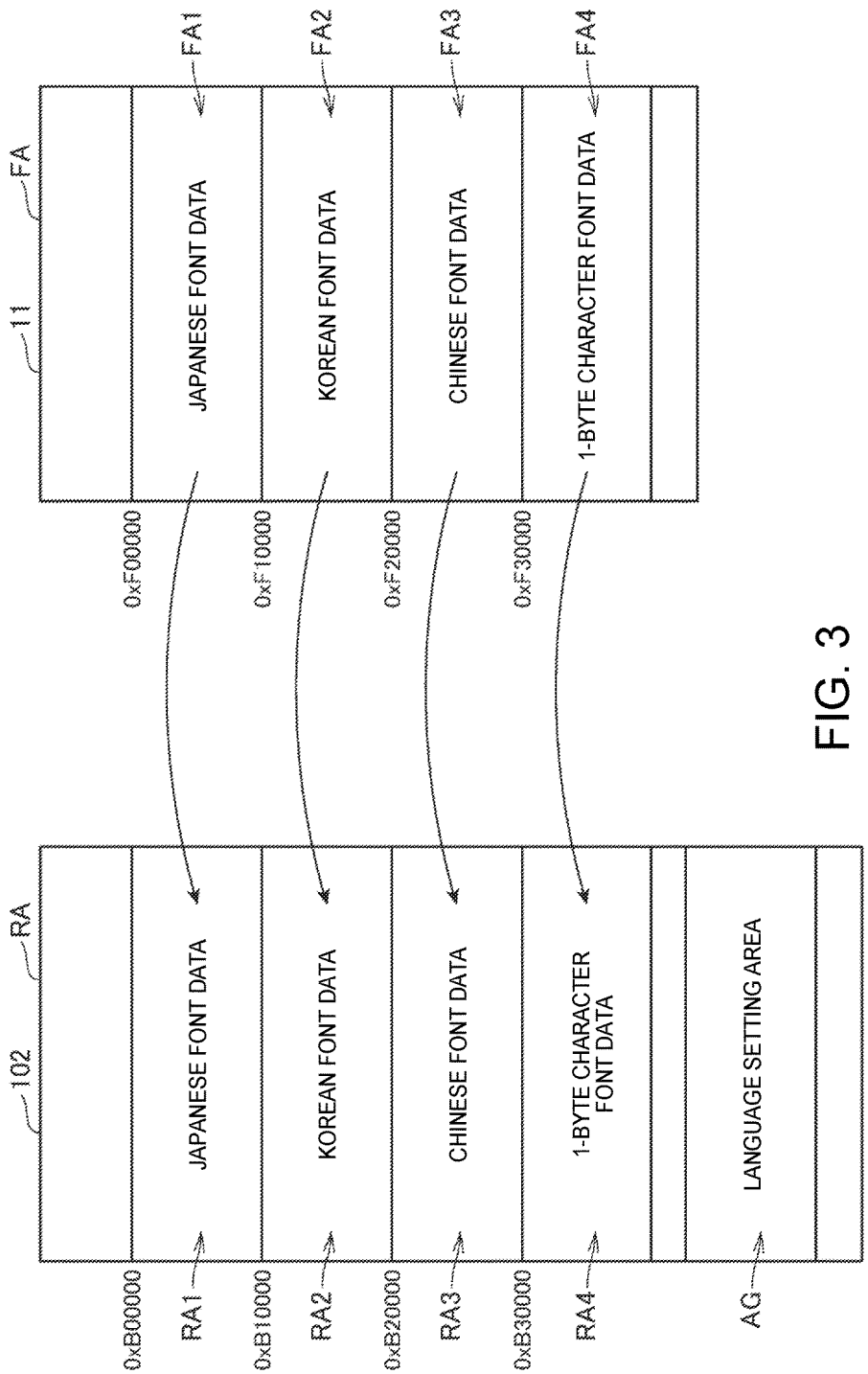
FIG. 3 is a block diagram used to describe copying to RAM.

FIG. 3 illustrates copying the Japanese font data 110, Korean font data 111, Chinese font data 112, and 1-byte character font data 113 to RAM 102.

As described above, the Japanese font data 110, Korean font data 111, Chinese font data 112, and 1-byte character font data 113 are stored in nonvolatile memory 11. The Japanese font data 110, Korean font data 111, Chinese font data 112, and 1-byte character font data 113 are stored at specific areas in the storage area FA of the nonvolatile memory 11. The areas where the Japanese font data 110, Korean font data 111, Chinese font data 112, and 1-byte character font data 113 are stored in the storage area FA of nonvolatile memory 11 are managed by the starting address (location information) of the specific area where the font data is stored. In the example in FIG. 3, the starting address of the storage area FA1 storing Japanese font data 110 is 0xF00000; the starting address of the storage area FA2 storing Korean font data 111 is 0xF10000; the starting address of the storage area FA3 storing Chinese font data 112 is 0xF20000; and the starting address of the storage area FA4 storing 1-byte character font data 113 is 0xF30000. In this way, the controller 10, by determining the starting address, can uniquely identify the storage area FA in the nonvolatile memory 11 where the desired font data is stored.

In step S2, when copying the Japanese font data 110 from nonvolatile memory 11 to RAM 102, the controller 10 identifies storage area FA1 as the storage area FA storing the Japanese font data 110 based on the starting address of 0xF00000. The controller 10 then copies the Japanese font data 110 stored in the identified storage area FA1 to RAM 102. The controller 10 copies the Korean font data 111, Chinese font data 112, and 1-byte character font data 113 to RAM 102 in the same way.

In this embodiment, storage area RA4 is fixed as the storage area RA in RAM 102 to which the 1-byte character font data 113 is copied. In other words, when copying 1-byte character font data 113 from nonvolatile memory 11 to RAM 102, the controller 10 writes the 1-byte character font data 113 to a predetermined storage area in RAM 102.

FIG. 3 shows the storage areas RA in RAM 102 where the Japanese font data 110, Korean font data 111, Chinese font data 112, and 1-byte character font data 113 is stored. In addition to the storage areas RA to which the Japanese font data 110, Korean font data 111, Chinese font data 112, and 1-byte character font data 113 are respectively copied, a language setting area AG in which the starting address of each font data storage area is stored is also formed in RAM 102. The capacity of the storage area RA of the RAM 102 in this embodiment only needs to be large enough to store at least the Japanese font data 110, Korean font data 111, Chinese font data 112, and 1-byte character font data 113, and a language setting area AG.

In FIG. 3, the starting address in the storage area RA of RAM 102 of the storage area RA1 storing Japanese font data 110 is 0xB00000. In the storage area RA of RAM 102, the starting address of the storage area RA2 storing Korean font data 111 is 0xB10000. In the storage area RA of RAM 102, the starting address of the storage area RA3 storing Chinese font data 112 is 0xB20000. In the storage area RA of RAM 102, the starting address of the storage area RA4 storing 1-byte character font data 113 is 0xB30000.

By determining the starting address, the controller 10 can uniquely identify each area where font data is stored in the storage area RA of RAM 102. The starting address is therefore equivalent to location information indicating the location of the area storing particular font data in the storage area RA of RAM 102.

As described above, when copied from nonvolatile memory 11, the 1-byte character font data 113 is written to a predetermined storage area RA4 in the storage area RA of RAM 102. Therefore, the starting address of the storage area RA4 storing the 1-byte character font data 113 does not change each time the font data is copied. However, for Japanese font data 110, Korean font data 111, and Chinese font data 112, the starting address of the area storing the respective font data may change according to the order in which the font data was copied to RAM 102.

Referring again to the flow chart in FIG. 2, when the controller 10 copies the Japanese font data 110, Korean font data 111, Chinese font data 112, and 1-byte character font data 113 to RAM 102, it also stores the starting address of each area storing the font data to nonvolatile memory 11 (step S3). In the example in FIG. 3, the controller 10 stores 0xB00000, the starting address of the storage area RA1 storing Japanese font data 110, to nonvolatile memory 11. The controller 10 also stores 0xB10000, the starting address of the storage area RA2 storing Korean font data 111, to nonvolatile memory 11. The controller 10 also stores 0xB20000, the starting address of the storage area RA3 storing Chinese font data 112, to nonvolatile memory 11. When storing a starting address to nonvolatile memory 11, the controller 10 also relationally stores information indicating the language. For example, when storing the starting address of 0xB00000, the controller 10 relationally stores information indicating Japanese is the corresponding language.

Note that the controller 10 may be configured to acquire the starting address of the storage area FA4 storing 1-byte character font data 113 in step S3, but in this example is not configured to acquire the starting address. In a configuration not acquiring this starting address, the starting address (0xB30000 in FIG. 3) of the storage area FA4 storing 1-byte character font data 113 is previously stored in nonvolatile memory 11, for example. This configuration is possible when the storage area RA4 storing the 1-byte character font data 113 is previously set.

Next, the controller 10 determines whether or not to execute the printing operation (step S4). For example, if a command and print data were received from a host computer or other external device, the controller 10 determines to execute the printing operation (step S4: YES). In this embodiment, the print data contains a character code for each character to print on roll paper. As described below, the received command includes information indirectly specifying starting addresses, and is therefore an example of a command specifying location information. This command may also include information directly specifying the starting address of a language.

Next, if the controller 10 decides to execute the printing operation (step S4: YES), it determines if all character codes in the print data are character codes related to at least some characters defined by one byte (step S5). If all character codes in the print data are characters in the range 0x21 to 0x7E (hexadecimal), the controller 10 determines all character codes included in the print data are character codes related to a subset of characters defined by one byte. Note that in this embodiment at least some of the characters defined by one byte are half-width alphanumeric characters or other specific symbols.

Next, if the controller 10 determines all character codes in the print data are character codes related to at least some characters defined by one byte (step S5: YES), the controller 10 determines all character codes in the print data are character codes related to at least some characters defined by one byte (step S6). When the controller 10 determines all character codes in the print data are character codes related to at least some characters defined by one byte, it references the 1-byte character font data 113 stored in RAM 102, and controls the printing mechanism 13 to print based on the print data (step S8). As described above, the storage area RA4 storing 1-byte character font data 113 in RAM 102 is predetermined independently of the language. The controller 10 can therefore uniquely identify the storage area RA4 storing 1-byte character font data 113 in RAM 102 based on the previously stored starting address. Based on the uniquely identified storage area, that is, the 1-byte character font data 113 stored in the storage area RA4, the controller 10 reads the 1-byte character font data for each character code in the print data, and prints half-width alphanumeric characters and other specific symbols on roll paper. As a result, the printer 1 can produce a receipt printed with half-width alphanumeric characters and other specific symbols.

Referring again to step S5, if the controller 10 determines all character codes in the print data are not character codes related to at least some characters defined by one byte (step S5: NO), the controller 10 determines the print data contains at least one of character codes related to characters defined by two bytes, and character codes for other than at least some characters defined by one byte (step S7). An example of character codes for characters other than for at least some characters defined by one byte are the character codes for half-width Japanese kana characters.

Next, when the controller 10 makes the decision in step S7, it determines if the language of the characters to print on the roll paper was specified (step S9). If the language of the characters to print on the roll paper was specified (step S9: YES), the controller 10 sets the starting address of the area storing font data for the specified language in the language setting area AG of RAM 102 (step S10). If the language of the characters to print on the roll paper was not specified (step S9: NO), the controller 10 sets the starting address of the area storing font data for the default language in the language setting area AG of RAM 102 (step S11).

In this example, the language of characters printed by the printer 1 by default is Japanese. The printer 1 is installed at the checkout counter in a retail store, and produces receipts based on the products purchased by the customers. If the checkout clerk at the checkout counter determines the language used by the customer is Korean, or the customer requests a receipt printed in Korean, the clerk operates the keyboard of the host computer to set the language of the characters printed on the receipt to produce to Korean. The host computer then generates and sends to the printer 1 a command including information setting Korean as the specified language.

When the controller 10 of the printer 1 receives through the communicator 12 a command containing information specifying Korean and print data, it determines there is a command specifying the language of the characters to print, and determines to execute the printing operation. The controller 10 of the printer 1 then sets the starting address of the storage area RA2 storing Korean font data 111 in the language setting area AG of the RAM 102 based on the starting address stored in nonvolatile memory 11. In the example in FIG. 3, the controller 10 sets 0xB10000 as the starting address in the language setting area AG.

If the checkout clerk determines the language used by the customer is Japanese, the clerk operates the host computer without specifying the language used by the customer. If the language of the characters to print is not specified, the host computer generates print data including a command including information instructing printing and character codes for characters in Japanese without generating a command specifying the language, and sends the generated print data to the printer 1.

When the controller 10 of the printer 1 receives this command and print data through the communicator 12, it determines there is not a command specifying the language of the characters to print, and determines to execute the printing operation. The controller 10 of the printer 1 then sets the starting address of the storage area RA2 storing Japanese font data 110 in the language setting area AG of the RAM 102. In the example in FIG. 3, the controller 10 sets 0xB00000 as the starting address in the language setting area AG.

Because the default language is set when the command does not contain information specifying the language, this command is equivalent to a command specifying the location (address) of the default font data. The default language can be set to any language, and the corresponding starting address can also be set.

Next, based on the starting address set in the language setting area AG, the controller 10 reads the font data for the character codes included in the print data, and drives the printing mechanism 13 to print based on the print data that was received (step S12).

Suppose, for example, that the starting address of storage area RA2 storing Korean font data 111 (0xB10000 in FIG. 3) is set in the language setting area AG. In this case, the controller 10 identifies the area indicated by the starting address in the language setting area AG as the area from which to read the font data corresponding to the character codes in the received print data. Based on the identified storage area, that is, the Korean font data 111 stored in storage area RA2, the controller 10 then reads the single Korean character font data for each character code in the print data, and prints Korean characters on the roll paper. As a result, the printer 1 can produce a receipt printed in Korean characters.

The amount of data in the font data for one character in this example is 192 bytes. The product of 192 bytes times the difference between the received character code and the character code corresponding to the starting address becomes the address where the font data corresponding to the received character code is stored referenced to the character code. The actual address is obtained by adding the starting address. If 192 bytes of font data is read from this actual address, the character corresponding to the received character code can be printed.

In another example, suppose that the starting address of storage area RA1 storing Japanese font data 110 (0xB00000 in FIG. 3) is set in the language setting area AG. In this case, the controller 10 identifies the area indicated by the starting address in the language setting area AG as the area from which to read the font data corresponding to the character codes in the received print data. Based on the identified storage area, that is, the Japanese font data 110 stored in storage area RA1, the controller 10 then reads the single Japanese character font data for each character code in the print data, and prints Japanese characters on the roll paper. As a result, the printer 1 can produce a receipt printed in Japanese characters.

In another example, suppose that the starting address of storage area RA3 storing Chinese font data 112 (0xB20000 in FIG. 3) is set in the language setting area AG. In this case, the controller 10 identifies the area indicated by the starting address in the language setting area AG as the area from which to read the font data corresponding to the character codes in the received print data. Based on the identified storage area, that is, the Chinese font data 112 stored in storage area RA3, the controller 10 then reads the single Chinese character font data for each character code in the print data, and prints Chinese characters on the roll paper. As a result, the printer 1 can produce a receipt printed in Chinese characters.

Returning to the flow chart in FIG. 2, after printing, the controller 10 determines whether or not to shut down the printer 1 system (step S13). If the controller 10 determines to not shut down the printer 1 system (step S13: NO), the controller 10 returns to step S4 and determines whether or not to print again.

As described above, by the language of the characters to print on a receipt being specified for each receipt to produce, the controller 10 can set the starting address of the font data to reference, and change to the font data of the specified language based on the starting address that is set. For each receipt produced, the controller 10 can therefore change the language of the characters printed on the receipt, and a single printer 1 can easily print characters in multiple languages. More specifically, because the printer 1 can easily print characters in multiple languages, the controller 10 can easily control the printer 1 to produce receipts with characters printed in the language understood by the customer.

As described above, when the controller 10 determines all character codes in the print data are character codes related to at least some characters defined by one byte, the controller 10 references the 1-byte character font data 113 and prints half-width alphanumeric characters or other specific symbols on roll paper. Suppose, for example, that the printer 1 prints two receipts, a receipt in Japanese and a receipt in Chinese. The characters printed on the receipt in Japanese and the receipt in Chinese that are produced are all half-width alphanumeric characters defined by one byte.

As described above, the Japanese font data 110 and Chinese font data 112 both include character codes related to some characters defined by one byte. Therefore, by changing the language of the characters printed on the receipt, the printer 1 can produce a receipt in Japanese and a receipt in Chinese. However, as described above, the characters identified by character codes related to at least some characters defined by one byte included in the Japanese font data 110, and the characters identified by character codes related to at least some characters defined by one byte included in the Chinese font data 112, are the same. As a result, if configured to change the language of the characters printed on the receipt when producing such receipts even though there is no need to change the language, the printer 1 will execute the process of changing the language unnecessarily.

In this embodiment of the invention, therefore, when 1-byte character font data 113 is stored in RAM 102, and all character codes included in the print data are character codes related to at least some characters defined by one byte, the controller 10 references the 1-byte character font data 113 to print the characters based on the print data. Therefore, to produce a receipt in Japanese with only half-width alphanumeric characters, and a receipt in Chinese with only half-width alphanumeric characters, there is no need for the controller 10 to change the language of the characters printed on the receipt. Therefore, when all character codes included in the print data are character codes related to at least some characters defined by one byte, the controller 10 does not need to change the language of the characters to print, and the processing load when printing can be reduced in a printer 1 configured to be able to print characters in multiple languages by itself.

When all character codes included in the print data are not character codes related to at least some characters defined by one byte, the controller 10 references the font data indicated by the starting address set in the language setting area AG to print characters on the roll paper.

Suppose, for example, that the printer 1 prints two receipts, a receipt in Korean and a receipt in Chinese. The characters printed on the receipt in Korean and the receipt in Chinese that are produced include at least characters defined by two bytes. By receiving a command specifying the language, and changing the starting address set in the language setting area AG, the printer 1 can change the language of the characters printed on the receipt and produce a receipt in Korean and a receipt in Chinese.

As described above, font data related to the character code 0xB0A1 is contained in both the Korean font data 111 and Chinese font data 112. However, because the languages are different, the actual character data related to the character code is also different, and the characters based on the same character code are different in the Korean font data 111 and Chinese font data 112. In this embodiment, when a command specifying the language is received, and the character codes contained in the print data are character codes related to characters defined by two bytes, the controller 10 changes the font data that it references based on the starting address set in the language setting area AG. As a result, when producing a receipt in Korean and a receipt in Chinese, for example, the controller 10 can prevent the language of the characters printed on the receipt being in a language not intended by the user. Specifically, Japanese, Korean, and Chinese are written with an extremely large number of characters, such as kanji, also known as Chinese characters. The probability is therefore high that Japanese font data 110, Korean font data 111, and Chinese font data 112 use the same character codes to represent different characters that are actually printed in each language. Therefore, the printer 1, by changing the starting address set in the language setting area AG for each receipt produced when a command specifying a language is received, can change the font data that is referenced, and can prevent printing characters in a language not intended by the user even when the language of the printed characters is a language with a high probability of using character codes that are also used in a different language.

As described above, because the controller 10 controls printing based on print data, the controller 10 copies Japanese font data 110, Korean font data 111, Chinese font data 112, and 1-byte character font data 113 from nonvolatile memory 11 to RAM 102. Based on the Japanese font data 110, Korean font data 111, Chinese font data 112, and 1-byte character font data 113 copies to RAM 102, the controller 10 then controls printing based on the print data. In general, the speed of reading data from volatile memory is faster than the speed of reading from nonvolatile memory 11. Furthermore, because RAM 102 is used as working memory of the CPU 100, the probability is high that the RAM 102 will be located closer than the nonvolatile memory 11 to the CPU 100 in the internal configuration of the printer 1. The controller 10 can therefore read data stored in RAM 102 before data stored in nonvolatile memory 11 can be read. As a result, by copying the Japanese font data 110, Korean font data 111, Chinese font data 112, and 1-byte character font data 113 from nonvolatile memory 11 to RAM 102, the speed at which font data can be read is faster than when reading the font data from the nonvolatile memory 11. The printer 1 can therefore improve the speed of processing printing based on print data.

The foregoing description describes a configuration in which, when the controller 10 receives a command specifying a language, the controller 10 does not change the font data if all character codes included in the print data are character codes related to at least some characters defined by one byte; but does change the font data if the character codes include character codes related to characters defined by two bytes, or character codes for characters other than at least some characters defined by one byte.

However, the font data that is referenced may be changed in units of strings printed on the roll paper. For example, if the string representing "TOTAL 123" is printed on a particular receipt using both Japanese and Chinese, the controller 10 may print the string of Japanese, then change the starting address set in language setting area AG in response to a command specifying Chinese, and then print the Chinese string. The controller 10 may be configured to change the font data that is referenced, and change the language of the characters that are printed, in units of the strings printed on the roll paper. In this case, the strings included in the print data include information specifying the language by string unit. The controller 10 may also change the language in units of the characters that are printed on the roll paper. In both such cases, the controller 10 can easily control the printer 1 to print characters in multiple languages.

As described above, a printer 1 (printing device) according to the invention has a printing mechanism 13 for printing on recording paper (print media); RAM 102 for storing font data for multiple languages having at least some character codes in common, and the starting address (location information) of font data for each of the multiple languages; a communicator 12 for receiving a command specifying a starting address, and character codes; and a controller 10 for reading from RAM 102 font data corresponding to the character codes received by the communicator 12 based on the starting address specified by the command, and controlling the printing mechanism 13 to print based on the read font data.

The command specifying the starting address may be a command specifying a language. In this case, the starting address is specified based on the specified language.

As described, the controller 10, based on the starting address specified by a command, changes the font data corresponding to the character codes received by the communicator 12 to read the appropriate font data from among font data sets for multiple languages, and prints based on the font data that was read. As a result, the controller 10 can change the language of the printer 1 when printing, enabling a single printer 1 to easily print characters in multiple languages, even when, for each language, there are multiple font data sets having at least some character codes in common.

In the embodiment described above, the RAM 102 stores font data for at two languages selected from among Japanese, Chinese, and Korean.

As described above, the character sets for Japanese, Korean, and Chinese each contain an extremely large number of characters, such as kanji, in addition to alphanumeric characters. The probability is therefore high that the Japanese font data 110, Korean font data 111, and Chinese font data 112 contain some character codes that are the same even though the characters represented by the character codes are different in each language. The printer 1 can therefore easily change, in response to a command, the font data that is referenced for each receipt that is produced, and even when printing languages with a high probability of using the same character codes to represent different characters, can prevent printing characters in the language not intended by the user. The controller 10 can control a single printer 1 to easily print characters in at two languages selected from among Japanese, Chinese, and Korean.

The controller 10 also does not change the font data of the multiple languages when the character codes received by the communicator 12 are character codes related to at least some characters defined by one byte.

As described above, the characters expressed by the character codes related to at least some characters defined by one byte, such as the alphanumeric characters in the Japanese font data 110, and the characters expressed by the same character codes in the Chinese font data 112, are the same. As a result, when producing receipts in any of multiple languages, if the printer 1 is configured to change the language of the characters printed on the receipt even though there is no need to change the language, the printer 1 will execute the process of changing the language unnecessarily.

In this embodiment of the invention, therefore, when 1-byte character font data 113 is stored in RAM 102, and all character codes included in the print data are character codes related to at least some characters defined by one byte, the controller 10 references the 1-byte character font data 113 to print the characters based on the print data. Therefore, to produce a receipt in Japanese with only half-width alphanumeric characters, and a receipt in Chinese with only half-width alphanumeric characters, there is no need for the controller 10 to change the language of the characters printed on the receipt. Therefore, when all character codes included in the print data are character codes related to at least some characters defined by one byte, the controller 10 does not need to change the language of the characters to print, and the processing load when printing can be reduced in a printer 1 configured for printing characters in multiple languages by itself.

When the character codes received by the communicator 12 are character codes related to characters defined by two bytes, such as the character codes for kanji and other non-alphanumeric characters, the controller 10 changes the font data read from nonvolatile memory 11 to the font data corresponding to the starting address specified by a command.

As described above, font data related to the character code 0xB0A1 is contained in both the Korean font data 111 and Chinese font data 112. However, because the languages are different, the actual data related to the character code is also different, and the characters based on the same character code are different in the Korean font data 111 and Chinese font data 112. Therefore, in this example when the character codes included in the print data are character codes related to characters defined by two bytes, the controller 10 changes the font data that is referenced based on the starting address set in the language setting area AG. As a result, when producing receipts in Korean and receipts in Chinese, the controller 10 can prevent the language printed on the receipt being a language different from that intended by the user.

As described above, the printer 1 has nonvolatile memory 11. When the printer 1 turns on, the controller 10 copies the font data for multiple languages stored in nonvolatile memory 11 to RAM 102, and also stores to RAM 102 the starting address of the font data for each of the multiple languages in RAM 102.

In general, the speed of reading data from volatile memory is faster than the speed of reading from nonvolatile memory 11. Furthermore, because RAM 102 is used as working memory of the CPU 100, the probability is high that the RAM 102 will be located closer than the nonvolatile memory 11 to the CPU 100 in the internal configuration of the printer 1. The controller 10 can therefore read data stored in RAM 102 before data stored in nonvolatile memory 11 can be read. As a result, by copying the Japanese font data 110, Korean font data 111, Chinese font data 112, and 1-byte character font data 113 from nonvolatile memory 11 to RAM 102, the speed at which font data can be read is faster than when reading the font data from the nonvolatile memory 11. The printer 1 can therefore improve the speed of processing printing based on print data.

The invention is described above with reference to a preferred embodiment thereof, but the invention is not limited thereto and can be modified and adapted in many ways without departing from the scope of the accompanying claims.

For example, when the control method of the printer 1 described above (control method of a terminal device) is embodied using a computer in the printer 1, the invention can also be embodied as a program executed by the CPU 100 of the computer to implement the foregoing control method, as a recording medium recording the program readably by the CPU 100 of the computer, or by a transmission medium for transmitting the program. The recording medium may also be a magnetic or optical recording medium, or a semiconductor memory device, for example. Specific examples of such media include floppy disks, HDD (Hard Disk Drive), CD-ROM (Compact Disk Read Only Memory), DVD (Digital Versatile Disk), Blu-Ray® Disc, magneto-optical discs, flash memory, memory card media, and other types of removable and fixed recording media. The recording medium may also be an internal storage medium of the printer 1, including RAM 102 (random access memory), ROM 101 (read-only memory), a hard disk drive, or other nonvolatile storage medium.

In addition, the processing units shown in FIG. 2 are divided according to the main processing content to simplify understanding the process of the printer 1, and the invention is not limited by the method of grouping or naming the process units. The process of the printer 1 may be divided according to the process content into a greater number of process units. A single process unit may also be divided to include even more processes.

The function units shown in FIG. 1 also illustrate functional configurations, and the specific embodiment thereof is not specifically limited. More specifically, hardware components corresponding individually to each function unit are not necessarily required, and configurations in which a single processor embodies the functions of multiple function units by executing a specific program or programs are obviously conceivable. Some functions embodied by software in the foregoing embodiments may instead be embodied by hardware, and some functions embodied by hardware in the foregoing embodiments may instead be embodied by software. The specific detailed configuration of other parts of the printer 1 can also be modified as desired without departing from the scope of the accompanying claims.

Additionally, for example, the printer 1 is described as a thermal printer having a thermal printhead, but the invention is not so limited. For example, the invention can also be applied to inkjet printers, dot impact printers, and other types of printers.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
   a printing mechanism configured to print on a print medium;
   storage, wherein the storage is configured to store font data for multiple languages, wherein at least some of the character codes in more than one of the multiple languages are the same, wherein the storage is configured to store location information for the font data of each of the multiple languages;
a communicator configured to receive a command specifying location information and specifying character codes from an external device; and
a controller configured to determine a starting address in the storage of a storage area that stores one of the multiple languages based on the location information received in the command,
wherein the controller is configured to read font data corresponding to the character codes received by the communicator from the storage area associated with the starting address based on the location information specified by the command, and control the printing mechanism to print characters on the medium based on the font data read from the storage area.

2. The printer described in claim 1, wherein the storage is configured to store font data for at least two of the following languages: Japanese, Chinese, and Korean.

3. The printer described in claim 1, wherein:
the controller does not change the font data of the multiple languages when the character codes received by the communicator are character codes related to at least some characters defined by one byte.

4. The printer described in claim 1, wherein:
when the character codes received by the communicator are character codes related to characters defined by two bytes, the controller changes the font data read from storage to font data corresponding to the location information specified by the command.

5. The printer described in claim 1, further comprising: nonvolatile memory;
wherein the storage includes volatile memory; and
wherein the controller, when the printer turns on, copies the font data for multiple languages stored in the nonvolatile memory to the volatile memory, and stores in the volatile memory the location information corresponding to the font data of the multiple languages in the volatile memory.

6. A method for controlling a printer that includes a printing mechanism configured to print on a print medium, the method comprising:
storing font data for each of multiple languages in a storage, wherein each of the multiple languages is stored in a corresponding storing area of the storage and each storage area is associated with a starting address, wherein at least some character codes in more than one of the multiple languages are the same;
storing location information of the font data for each of the multiple languages, the location information including at least the starting address;
receiving a command specifying location information from an external device at a communicator and receiving character codes from the external device;
determining the starting address of the storage area for one of the multiple languages based on the location information included in the command;
reading font data corresponding to the character codes received by the communicator from the storage area associated with the determined starting address based on the location information specified by the command; and
controlling the printing mechanism to print characters on the medium based on the font data read from the determined storage area.

7. The method described in claim 6, wherein the storage stores font data for at least two of the following languages: Japanese, Chinese, and Korean.

8. The method described in claim 6, further comprising:
not changing the font data of the multiple languages when the character codes received by the communicator are character codes related to at least some characters defined by one byte.

9. The method described in claim 6, further comprising:
when the character codes received by the communicator are character codes related to characters defined by two bytes, changing the font data read from storage to font data corresponding to the location information specified by the command.

10. The method described in claim 6, wherein:
the printer includes a nonvolatile memory, and
the storage is volatile memory;
the method further comprising:
when the printer turns on, copying the font data for multiple languages stored in the nonvolatile memory to the volatile memory, and storing in the volatile memory the location information corresponding to the font data of the multiple languages in the volatile memory.

* * * * *